United States Patent [19]

Liao et al.

[11] Patent Number: 5,702,624
[45] Date of Patent: Dec. 30, 1997

[54] COMPETE HOT PLATE TEMPERATURE CONTROL SYSTEM FOR HOT TREATMENT

[75] Inventors: Ching-Wen Liao, Taipei Hsien; Chin-Chuan Kuo, Chia; Chi-Kang Peng; Tsun-Ching Lin, both of Hsin-chu, all of Taiwan

[73] Assignee: Taiwan Semiconductors Manfuacturing Company, Ltd, Hsin-Chu, Taiwan

[21] Appl. No.: 728,022

[22] Filed: Oct. 9, 1996

[51] Int. Cl.$^6$ .................................................. H05B 1/02
[52] U.S. Cl. .......................... 219/497; 219/449; 219/453; 219/481; 219/486; 340/655
[58] Field of Search .................................. 219/506, 486, 219/481, 497, 505, 508, 448, 449, 453; 340/655, 654

[56] References Cited

U.S. PATENT DOCUMENTS

| | | | |
|---|---|---|---|
| 3,976,985 | 8/1976 | Schalow et al. | 340/228 R |
| 4,053,876 | 10/1977 | Taylor | 340/233 H |
| 4,564,748 | 1/1986 | Gupton | 219/497 |
| 4,625,086 | 11/1986 | Karino | 219/506 |
| 4,852,544 | 8/1989 | Williams et al. | 126/39 BA |
| 5,103,801 | 4/1992 | Herring et al. | 126/374 |
| 5,353,007 | 10/1994 | Gullotti | 340/477 |
| 5,369,246 | 11/1994 | Nanos | 219/388 |

Primary Examiner—Mark H. Paschall
Attorney, Agent, or Firm—George O. Saile; Stephen B. Ackerman

[57] ABSTRACT

A heat treatment control system to cure a photoresist that is deposited upon a semiconductor substrate is described. The heat treatment system has a hot plate with a heating element and temperature sensing devices that are in close proximity to the semiconductor substrate. The heat treatment system also has a controlling device that will selectively provide an electrical power source to the heating element to heat the semiconductor wafer. The coupling of the heating element to an electrical power source is determined by an electrical signal from one of the temperature sensing devices that have been conditioned and compared to a set temperature signal to provide an error signal. The controlling device will examine the error signal and adjust the temperature. An over temperature alarm circuit is connected to the second temperature sensing device. If the temperature sensing device indicates the temperature of the semiconductor substrate is significantly greater than the set temperature, the over temperature alarm circuit will activate an audible and visual alarm and transfer a over temperature fault signal to the controlling device. A power monitor circuit will determine the presence of the electrical current in the heating element and activate an audible and visual alarm. The operating personnel will disconnect the electrical power source, if there is a over temperature alarm or a power fault alarm.

6 Claims, 3 Drawing Sheets

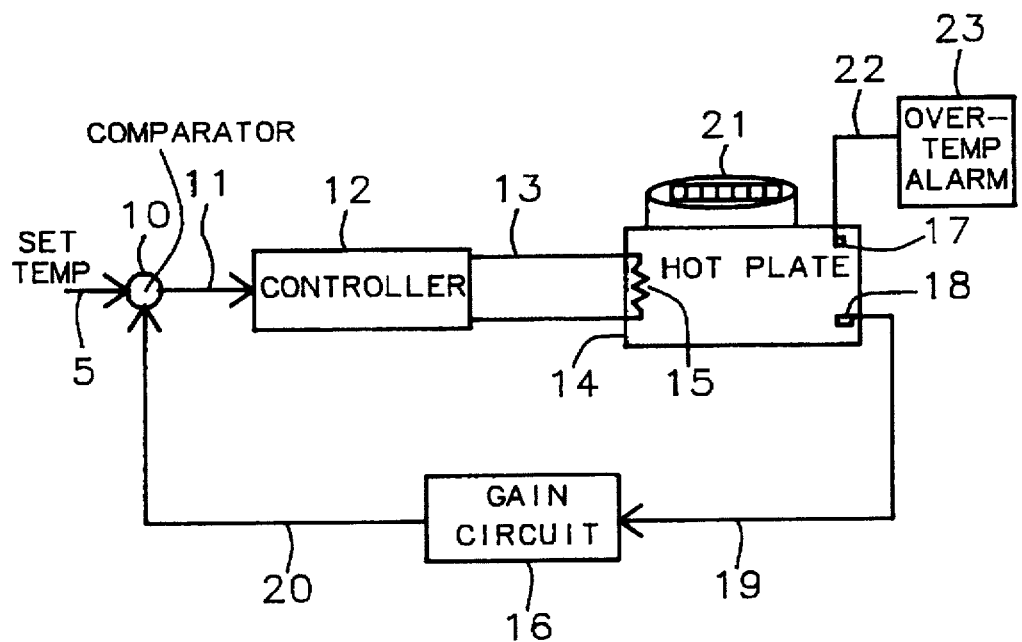
*FIG. 1 - Prior Art*
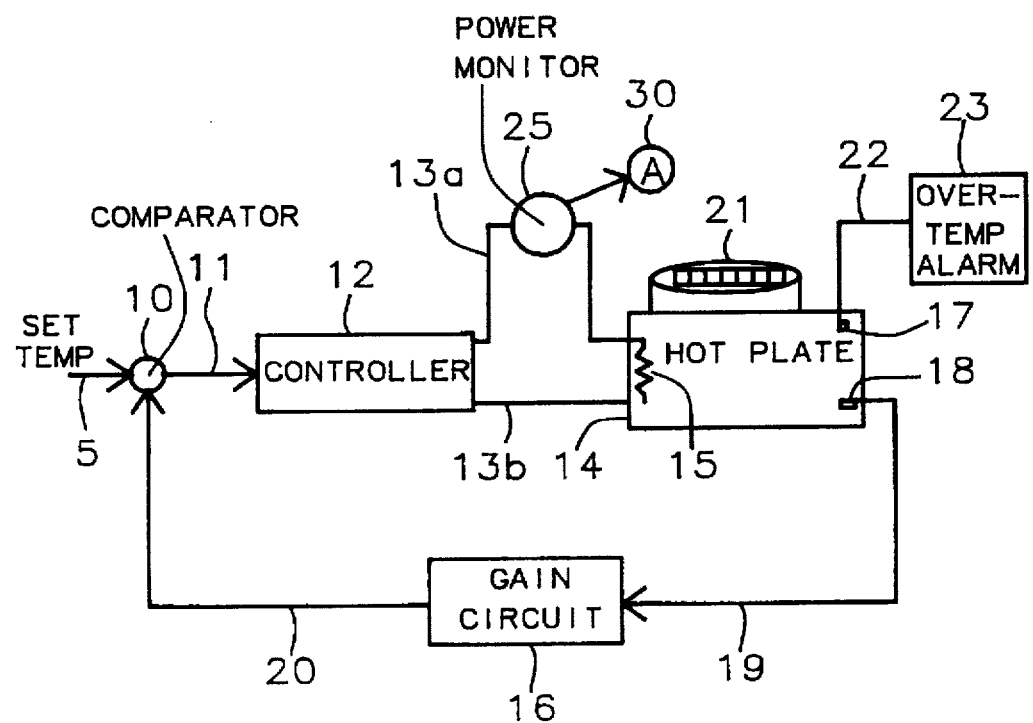
*FIG. 2*

COMPETE HOT PLATE TEMPERATURE CONTROL SYSTEM FOR HOT TREATMENT

BACKGROUND OF THE INVENTION

1. Field of the Invention

This invention relates to temperature control and more particularly to circuits and subsystems that monitor and control the heating of photoresist that is deposed upon semiconductor substrates during integrated circuits processing.

2. Description of Related Art

Various methods for the control of the temperature of semiconductor substrates during integrated circuit processing are well known in the art. FIG. 1 illustrates schematically a temperature control subsystem of prior art. A set temperature signal 5 is provided from an external interface. The set temperature signal 5 is compared with a measured temperature signal 20 in the comparator 10 to form an error signal 11 is an input to the controller 12.

The controller 12 is connected through power distribution lines 13 to heating element 15 within the hot plate 14. Placed onto the hot plate 14 is a semiconductor substrate 21 on to which a photoresist material is deposited. The controller 12 activates a voltage source (not shown) to allow a current to flow through the power distribution lines 13 into the heating element 15. The current flowing through the heating element 15 is converted to heat that is transferred to the semiconductor substrate 21. The temperature sensor 18 provides a first electrical signal 19 that is proportional to the temperature of the semiconductor substrate 21. The first electrical signal 19 is coupled to the signal gain circuit 16 which will amplify, filter, and condition the first electrical signal 19 to form the measured temperature signal 20.

The temperature sensor 17 provides a second electrical signal 22 that is proportional to the temperature of the semiconductor substrate 21. The second electrical signal 22 is coupled to the over temperature alarm circuit 23 which will activate an audible and/or visual alarm if the temperature of the semiconductor substrate 21 is significantly greater than the desired temperature. This large temperature may cause damage to the photoresist material deposed upon the semiconductor substrate 21.

If the temperature remains low the error signal 11 will indicate that the controller 12 should continuously activate the voltage source. If there is an interruption in the power distribution lines 13 or the heating element 15, the hot plate 14 will not heat the semiconductor substrate 21. This will not cure the photoresist material and cause a loss of the semiconductor substrate 21 in subsequent processing.

Even if the over temperature alarm activates, the audible or visual alarm, the controller 12 will have no indication of an over temperature condition, other than the error signal 11. If there is a malfunction in the set temperature signal 5, the measured temperature signal 20, the comparator 10, or within the controller 12, the controller can not disable the application of the voltage source and the electrical current will continue to flow through the distribution lines 13 and the heating element 15. This further increases the damage to the photoresist material.

U.S. Pat. No. 5,369,246 (Nanos) describes a temperature control system for a lamination system to laminate identification sized cards between two layers of laminating material. The patent shows a temperature sensing and controlling function, but no power monitoring or over temperature alarming function.

U.S. Pat. No. 5,353,007 (Gullotti) discloses a turn signal warning device that includes a power monitoring device to indicate that automotive turn signal indicators have been activated for an exceedingly long period of time.

SUMMARY OF THE INVENTION

An object of this invention is to provide a heat treatment system for the curing of a photoresist material. Another object of this invention is the control of the temperature of the curing of the photoresist material. Further another object of this invention is the monitoring of the power source application to the heating element within the heat treatment system, and still another object of this invention is the activation of visual and audible alarms of both an over temperature and loss of the connection of the power source to the heating element within the heat treatment system.

To accomplish these and other objectives a heat treatment system has a heating apparatus. The heating apparatus has a heating element, a heating plate, and two temperature sensing devices. The heating plate, which is in close proximity to the heating element, is the location for the placement of a semiconductor substrate. The two temperature sensors each produce electrical signals that represent the magnitude of the temperature of the semiconductor substrate.

The heat treatment system has a controller that will selectively connect a power source to the heating element. The connection of the power source will be dependent on the temperature of the semiconductor substrate. Connected to the controller is an error signal that is generated in a comparator. The comparator compares an temperature set signal and a measured temperature signal to form the error signal.

The measured temperature signal is formed by the feedback means that conditions one of the electrical signals from the temperature sensors to form the measured temperature signal.

The heat treatment system has an over temperature alarm that takes the second electrical signal from the second temperature sensor and determines if the temperature of the semiconductor substrate is sufficiently high as to cause damage. If the temperature is too high, an audible and a visual alarm will be activated.

Further, the heat treatment system has a power monitoring circuit to detect the presence or absence of the power source in the heating element and activate an audible and visual alarm if the power source has been interrupted.

BRIEF DESCRIPTION OF THE DRAWINGS

FIG. 1 is a schematic diagram of a photoresist heat treatment system of prior art.

FIG. 2 is schematic diagram of a photoresist heat treatment system including a power monitoring subsystem of this invention.

DETAILED DESCRIPTION OF THE INVENTION

Figure 3:
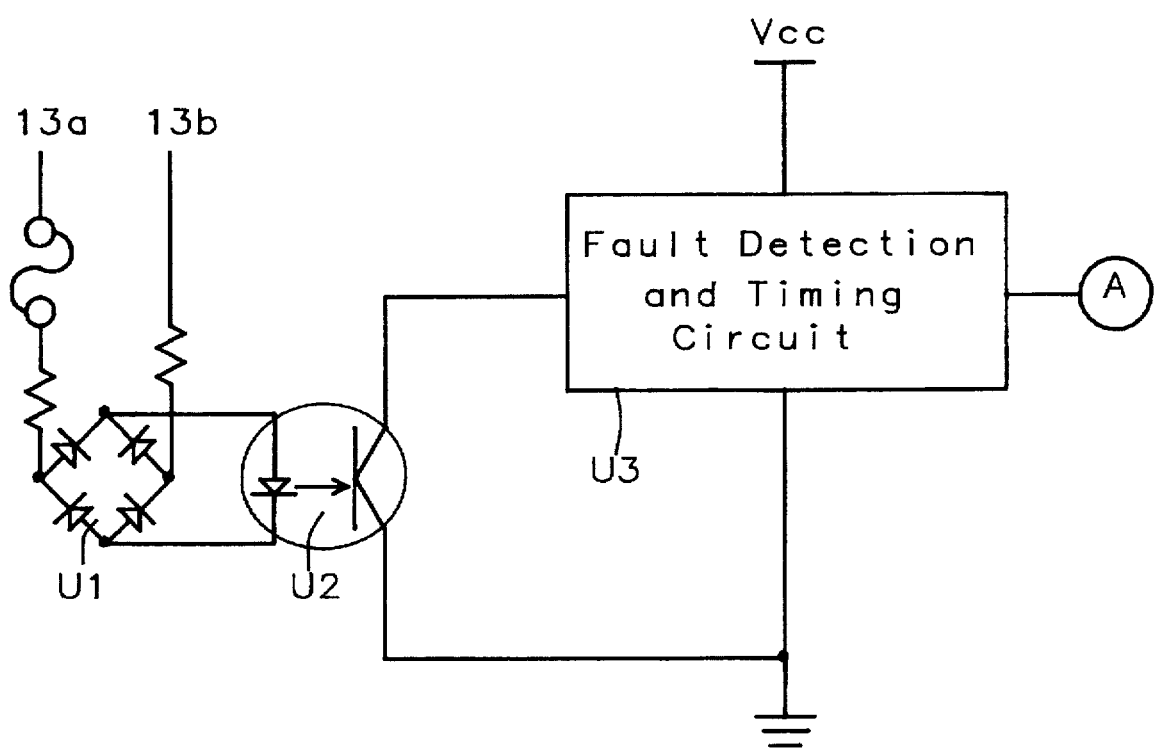
FIG. 3 is schematic diagram of preferred implementation of a power monitor circuit of this invention.

Referring to FIG. 2, the heat treatment system has a set temperature signal 5 compared to a measured temperature signal 20 in the comparator 10 to form an error signal 11. The error signal 11 is coupled to the controller 12. In the controller 11 a voltage source (not shown) is selectively coupled to the heating element 15 through the power distribution lines 13. If the error signal 11 indicates the measured temperature signal 20 is less than the set temperature signal 5, then the controller will activate the coupling of the voltage source to the heating element 15. However, if the error signal 11 indicates the measured temperature signal 20 is greater than the set temperature signal 5, then the controller will deactivate the coupling of the voltage source from the heating element 15.

The measured temperature signal 20 is formed by the signal gain circuit 16. The signal gain circuit 16 conditions an electrical signal 19 that is created by the temperature sensor 18. The electrical signal 19 indicates the magnitude of the temperature of the semiconductor substrate 21 placed on the hot plate 14.

A second electrical signal 22 from a second temperature sensor 17 is connected to the over temperature alarm circuit 23. If the second electrical signal indicates the temperature of the semiconductor substrate 21 is significantly greater than the temperature represented by the set temperature signal 5, the over temperature alarm circuit 23 will activate an audible and visual alarm. At the activation of the over temperature alarm 23, operating personnel will deactivate the coupling of the voltage source from the heating element 5.

A power monitoring circuit 25 is connected in the power distribution lines 13a to sense the presence and absence of the electrical power source from the voltage source to the heating element 15. The power monitoring circuit 25 will ignore any short term absences of the current to the heating element 15 that occur in the process of maintaining the error signal 11 a null level that indicates the set temperature signal 5 is equal to the measured temperature signal 20. If the absence of the current to the heating element 15 is long term, the power monitoring circuit 25 will activate an audible and visual alarm 30. At the activation of the audible alarm 30, operating personnel can rectify the fault within the controller 12 or the heating element 15.

A preferred implementation of the power monitoring circuit 25 of FIG. 2 is shown in the schematic of FIG. 3. The power lines 13a and 13b are connected power distribution lines 13a and 13b of FIG. 2. In the preferred implementation of this invention, the voltage source is the utility AC power mains of the heat treatment system. The controller 15 of FIG. 2 activates the application of the AC power mains to the power distribution lines 13a and 13b of FIG. 2. The voltage of the AC power mains is rectified in a diode bridge rectifier $U_1$. The rectified voltage is connected to the photodiode section of the optocoupler $U_2$. The photodiode of optocoupler $U_2$ will emit light and the phototransistor of the optocoupler $U_2$ will be in a conducting state.

The collector of the phototransistor of the optocoupler $U_2$ is connected to the fault detection and timing circuit $U_3$. When the heating element 15 of FIG. 2, is activated by the application of the AC voltage to the power distribution lines 13a and 13b of FIG. 2, the phototransistor of the optocoupler $U_2$ is conducting and therefore has a low voltage present at its collector. This low voltage is interpreted in the fault detection and timing circuit $U_3$ as proper operation and the alarm A will remain inactive.

When the AC voltage to the power distribution lines 13a and 13b of FIG. 2 is interrupted, the phototransistor of the optocoupler $U_2$ ceases conduction and a voltage that approaches the value of the power supply Vcc is applied to the fault detection and timing circuit $U_3$. If the amount of time that the AC voltage is interrupted is short, the fault detection and timing circuit $U_3$ will activate the alarm A and the normal temperature control operation is assumed. If however, the period of time for the interruption of the AC voltage is exceedingly long, a fault is assumed and the fault detection and timing circuit $U_3$ will activate the alarm A. Operating personnel will deactivate the controller 15 of FIG. 2 and repair the fault.

Figure 4:
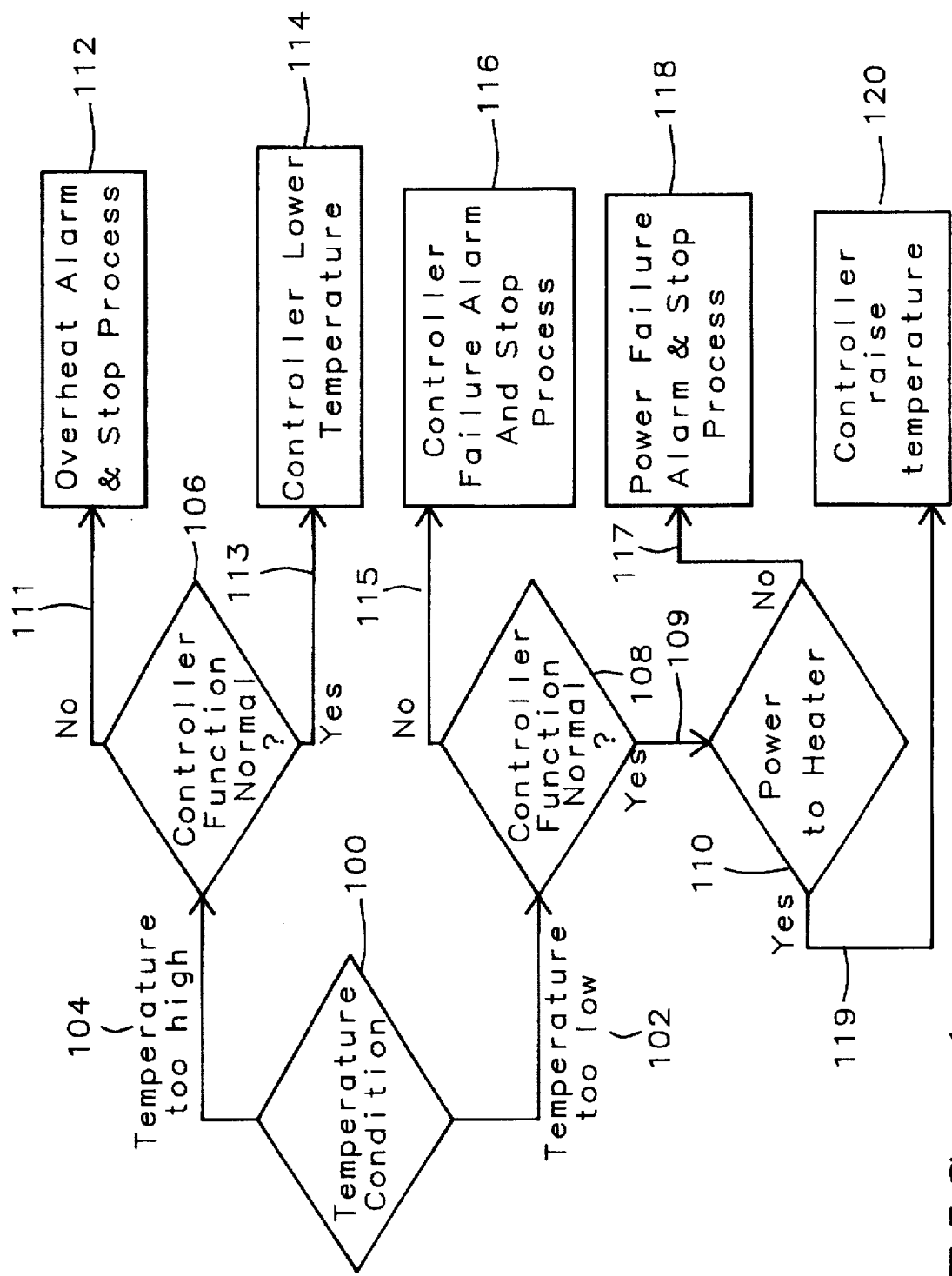
FIG. 4 is a flow diagram of the process implemented within the controller of this invention.

FIG. 4 is flow chart of the program within the temperature controller 12 of FIG. 2. Referring to FIG. 4 and FIG. 2, the controller 12 examines the error signal 11 for the test of the temperature condition 100. If the temperature is high 104, the controller 12 performs a self-diagnostic function 106. If the self-diagnostic function 106 indicates normal operation 113, the controller 12 deactivates the coupling of the voltage source to the heating element 15 to lower the temperature 114. If an over temperature level is detected or other malfunctions within the controller 12 is indicated 111 by the controller self-diagnostic function 106, the over temperature alarm 30 is activated and the controller will stop the process 112.

However if the test of the temperature condition indicates a temperature too low 102, the controller 12 performs a self diagnostic function 108. If the controller 12 has a malfunction 115, the controller 12 will activate an audible and visual alarm indicating the malfunction and stop the process 116. If the self-diagnostic function 108 indicates correct operation of the controller 109, but power monitor 25 indicates 119 that the voltage source can deliver current to the heating element 115, the controller 12 will allow the temperature to rise 120. However, if the power monitor indicates a fault 117, the power failure alarm 30 is activated and an operator will stop the process 118.

While this invention has been particularly shown and described with reference to the preferred embodiments thereof, it will be understood by those skilled in the art that various changes in form and details may be made without departing from the spirit and scope of the invention for application in other heat treatment applications.

What is claimed is:

1. A heat treatment system to cure a photoresist material deposed upon a semiconductor substrate, wherein said heat treatment is to elevate said semiconductor substrate to a temperature sufficient to cure said photoresist, and wherein said system comprises a) a heating apparatus comprising:
   a heating plate onto which said semiconductor substrate is placed,
   a heating element dispose in close proximity of said heating plate to elevate the temperature of said semiconductor substrate,
   a first temperature sensing device to provide a first electrical signal that represents the magnitude of the temperature, and
   a second temperature sensing device to provide a second electrical signal that represents the magnitude of the temperature;

b) a controlling device to selectively couple an electrical power source to the heating element, wherein the coupling of the electrical power source is determined by an error signal and said error signal will approach a null value when the temperature approaches the desired temperature;

c) a feedback gain means coupled to the first temperature sensing device to condition the first electrical signal to provide a measured temperature signal;

d) a comparing means to compare a temperature set signal that represents the desired temperature and the measured temperature signal to form the error signal;

e) an over temperature alarm means coupled to the second temperature device to monitor the second electrical signal, to provide an first audible signal and a first visual alarm if the temperature is at a level such as to cause damage to the photoresist material; and f) a power monitoring circuit to detect the presence and absence of the electrical power source, wherein said power monitoring circuit provides a second audible signal and a second visual, signal if the electrical power source is absent.

2. The system of claim 1 wherein the power monitoring circuit comprises:

a) a electrical power source sensing means to detect the presence or absence of the electrical power source; and b) a timing means having a fault timing period coupled to the electrical power source sensing means to prevent the second audible alarm and the second visual alarm and the second fault signal during the coupling and uncoupling of the electrical power source to raise and lower the temperature for a first time period and to activate the second audible alarm and the second visual alarm and the second fault signal for a second time period greater than the fault timing period, wherein said fault period indicates the absence of the electrical power source.

3. A heat treatment control device to regulate a temperature to cure a photoresist material disposed upon a semiconductor substrate, comprising:

a) a heating apparatus onto which said semiconductor substrate is positioned to heat said semiconductor substrate;

b) a controlling device to selectively couple an electrical power source to the heating element, wherein the coupling of the electrical power source is determined by an error signal and said error signal will approach a null value when the temperature approaches the desired temperature;

c) a first temperature sensing device coupled to the heating apparatus to provide and to condition a first electrical signal that represents the magnitude of the temperature;

d) a second temperature sensing device coupled to the heating apparatus to provide and to condition a second electrical signal that represents the magnitude of the temperature;

e) a comparing means to compare a temperature set signal that represents the desired temperature and the measured temperature signal to form the error signal;

f) an over temperature alarm means coupled to the second temperature sensing device to monitor the second electrical signal, to provide an first audible signal and a first visual alarm if the temperature is at a level such as to cause damage to the photoresist material; and g) a power monitoring circuit to detect the presence and absence of the electrical power source, wherein said power monitoring circuit provides a second audible signal and a second visual alarm if the electrical power source is absent.

4. The device of claim 4 wherein the heating apparatus comprises:

a) a heating plate onto which said semiconductor substrate is placed; and b) a heating element dispose in close proximity of said heating plate to elevate the temperature of said semiconductor substrate.

5. The device of claim 4 wherein the power monitoring circuit comprises:

a) a current sensing means to detect the presence or absence of the electrical power source; and b) a timing means having a fault timing period coupled to the current sensing means to prevent the second audible alarm and the second visual alarm and the second fault signal during the coupling and uncoupling of the electrical power source to raise and lower the temperature for a first time period and to activate the second audible alarm and the second visual alarm and the second fault signal for a second time period greater than the fault timing period, wherein said fault period indicates the absence of the electrical power source.

6. A method to control the heat treatment apparatus to heat a semiconductor substrate to cure a photoresist deposed upon said semiconductor substrate, comprising the steps of:

a) coupling an electrical power source to a heating element to heat said semiconductor substrate;

b) providing a first temperature measurement of the semiconductor substrate;

c) comparing said first temperature measurement to a temperature set level to form an error signal;

d) examining the error signal;

e) for the error signal indicating a temperature greater than a desired temperature, diagnostic testing of the controlling device;

f) for the controlling device functioning correctly, uncoupling said electrical power source to lower the temperature, and, g) for the controlling device not functioning correctly, uncoupling the electrical power source from the heating element and activating a first audible alarm and a first visual alarm;

h) for the error signal indicating the temperature is less than the desired temperature, diagnostic testing of the controlling device;

i) for the controlling device functioning correctly, sensing a current from said electrical power source to said heating element to verify said coupling;

j) if said coupling is present, returning to providing the first temperature measurement while allowing the temperature to raise;

k) if said coupling is not present and a fault timing period has elapsed, activating a second audible signal and a second visual alarm j) if said couplings become present before said fault timing period has elapsed, returning to providing the first temperature measurement while allowing the temperature to raise;

m) for the controlling device not functioning correctly, uncoupling of the electrical power source and activating the second audible alarm and the second visual alarm;

n) simultaneously to the foregoing steps, providing a second temperature measurement;

o) comparing said second temperature measurement to an over temperature threshold;

p) if said second temperature measurement is greater than the over temperature threshold, uncoupling of the electrical power source and activating a third audible alarm and a third visual alarm; and q) if said second temperature measurement is less than the over temperature threshold, repeatedly providing and comparing the second temperature measurement.

* * * * *